(12) United States Patent
Fritsch et al.

(10) Patent No.: US 7,878,650 B2
(45) Date of Patent: Feb. 1, 2011

(54) CONTACT LENS MATERIALS, DESIGNS, SUBSTANCES, AND METHODS

(76) Inventors: Michael H. Fritsch, 6400 Old Cheney Rd., Lincoln, NE (US) 68516; John H. Fritsch, 6400 Old Cheney Rd., Lincoln, NE (US) 68516; Josephine M. Fritsch, 6400 Old Cheney Rd., Lincoln, NE (US) 68516

( * ) Notice: Subject to any disclaimer, the term of this patent is extended or adjusted under 35 U.S.C. 154(b) by 301 days.

(21) Appl. No.: 11/823,898

(22) Filed: Jun. 29, 2007

(65) Prior Publication Data

US 2008/0002149 A1 Jan. 3, 2008

Related U.S. Application Data

(60) Provisional application No. 60/817,440, filed on Jun. 29, 2006.

(51) Int. Cl.
*G02C 7/04* (2006.01)
(52) U.S. Cl. .................................. 351/160 R
(58) Field of Classification Search ............ 351/160 R, 351/160 H, 161–162
See application file for complete search history.

(56) References Cited

U.S. PATENT DOCUMENTS

| 3,476,499 | A | 11/1969 | Wichterle |
| 3,557,261 | A | 1/1971 | Wichterle |
| 3,679,504 | A | 7/1972 | Wichterle |
| 4,174,156 | A | 11/1979 | Glorieux |
| 4,571,039 | A * | 2/1986 | Poler ....................... 351/160 H |
| 4,890,911 | A * | 1/1990 | Sulc et al. ............... 351/160 H |
| 5,515,117 | A * | 5/1996 | Dziabo et al. ........... 351/160 H |
| 5,831,713 | A | 11/1998 | Fritsch |
| 6,048,063 | A | 4/2000 | Fritsch |
| 2002/0021409 | A1* | 2/2002 | Marmo .................... 351/160 R |
| 2003/0043341 | A1* | 3/2003 | Turner et al. ............ 351/160 R |
| 2003/0117579 | A1* | 6/2003 | Morris et al. ................ 351/200 |
| 2003/0151718 | A1* | 8/2003 | Marmo et al. ................ 351/161 |
| 2005/0146679 | A1* | 7/2005 | Marmo et al. ........... 351/160 R |

* cited by examiner

*Primary Examiner*—Ricky L Mack
*Assistant Examiner*—James R Greece
(74) *Attorney, Agent, or Firm*—E. Victor Indiano; Indiano Law Group

(57) ABSTRACT

A contact lens is provided that is capable of being worn by a user. The lens includes a contact lens body having an eye-engaging surface placeable against a surface of an eye and an outer surface. Microphobic features are provided in the lens for eliminating microbes from the eye-engaging surface. Preferably, these microphobic features are chosen from a group consisting of electrical charge inducing agents, magnetic field inducing agents, chemical agents and textural features. In another embodiment of the present invention, a contact lens is provided that can include a reservoir portion capable of holding a performance enhancement agent for enhancing the performance of the lens. The performance enhancement agent can include such thins as sealant solutions, protective agents, therapeutic agents, anti-microbial agents, medications and reduced size transparent portions. In other embodiments, a wide variety of designs, materials and substances are disclosed for use with contact lenses.

4 Claims, 14 Drawing Sheets

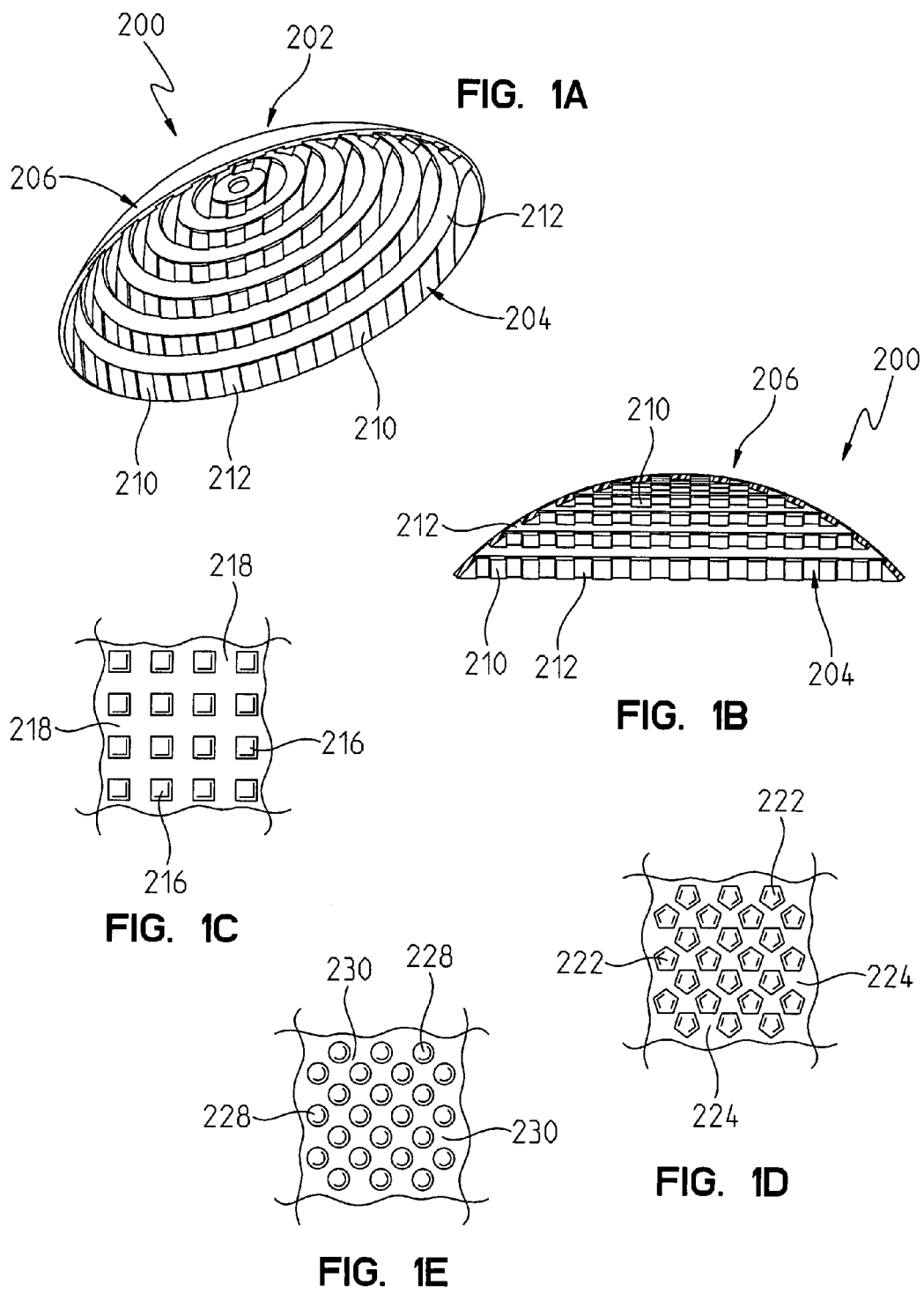

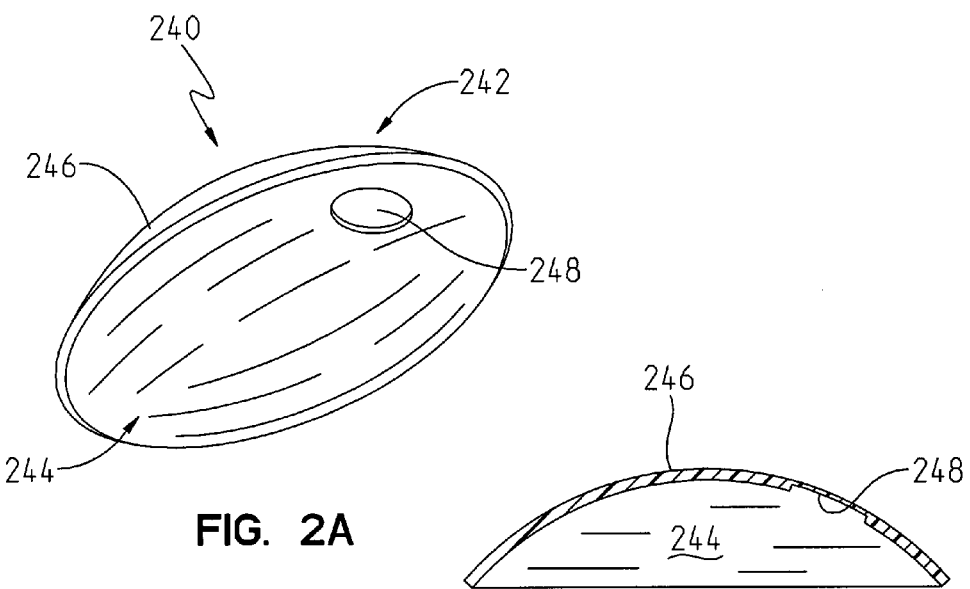
FIG. 2A
FIG. 2B
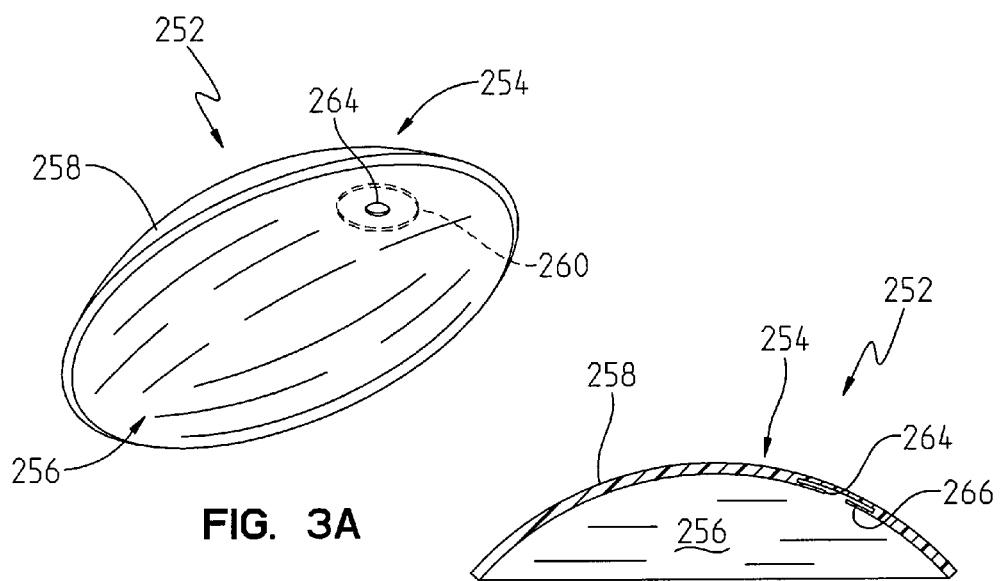
FIG. 3A
FIG. 3B

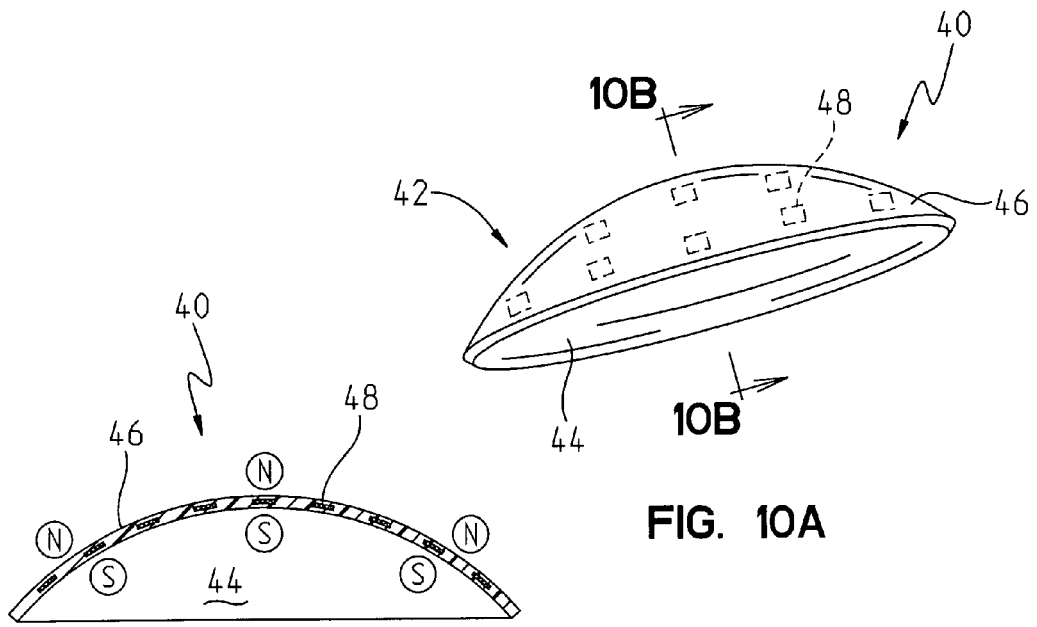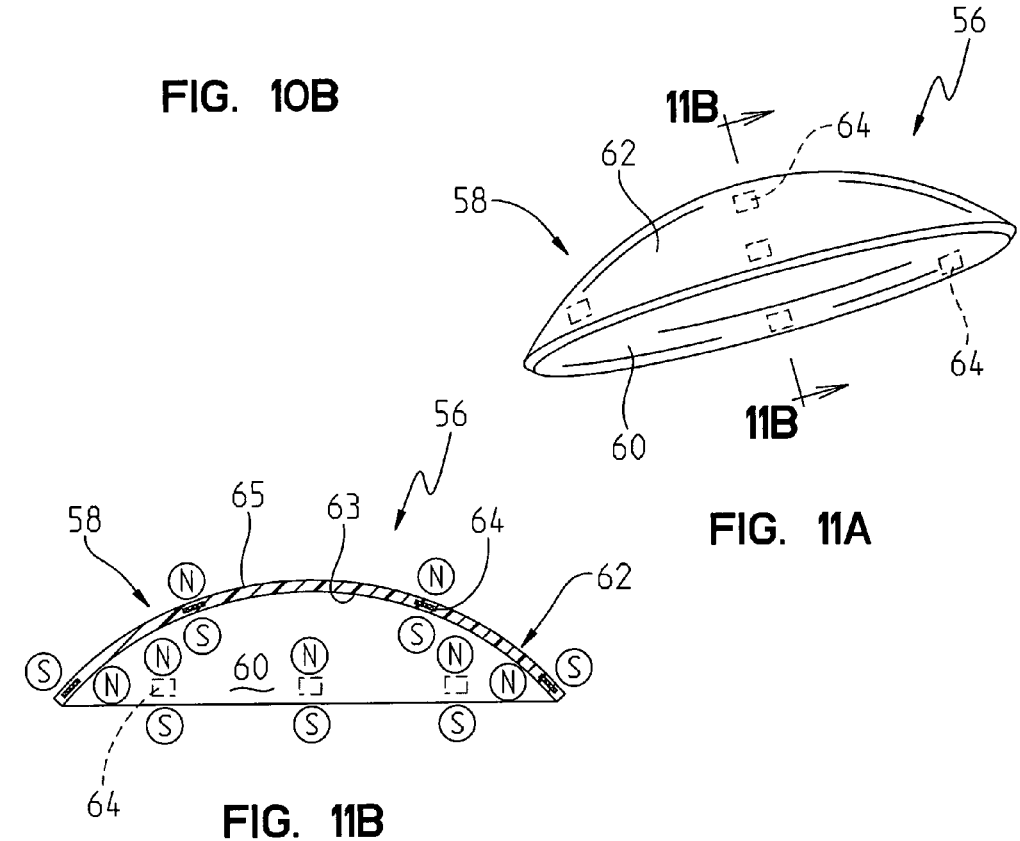

CONTACT LENS MATERIALS, DESIGNS, SUBSTANCES, AND METHODS

REFERENCE TO RELATED APPLICATIONS

This Application claims the benefit of Fritsch et al., U.S. Provisional Application No. 60/817,440, filed 29 Jun. 2006, which is incorporated herein by reference in its entirety.

TECHNICAL FIELD OF THE INVENTION

The present invention relates to contact lenses. In a preferred embodiment the present invention relates to contact lenses that can be used in situations wherein the user will spend extended periods of time in a water environment. It is believed that the present invention will be useable to replace swim goggles and scuba masks for swimmers, divers, snorklers and others who spend extended periods of time in the water.

In the most preferred embodiments of the present invention, novel inventive features are incorporated into contact lenses, such as water permeability features, microphobic eye infection prevention features, and features that can dispense one or more of medications, chemical substances, performance enhancement additives, electrical charges, magnetic fields, and light protectant agents that can help to block and/or reduce the amount of ultraviolet light that impacts the eye of the user wearing the contact lens of the present invention.

BACKGROUND OF THE INVENTION

Contact lenses are currently worn by a large number of users in lieu of glasses, as a means for improving the vision of the users. A contact lens is a corrective, cosmetic or therapeutic lens that is usually on the cornea of the eye. Modern contact lenses were invented by Otto Wichterle sometime around 1961.

Contact lenses serve the same corrective purpose as conventional glasses. Modern contact lenses are light weight and virtually invisible, although some contact lenses are tinted to make them more visible when being cleaned, and other lenses are deliberately colored for altering the appearance of the eye. It has been estimated that about 125 million people use contact lenses worldwide.

Although contact lenses are believed by many to represent a great improvement over eye glasses, room for improvement exists. One area in which room for improvement exists is to create contact lenses that are capable of use in water environments. These environments include the environments that one would encounter as a swimmer, scuba diver, or snorkler. To address these concerns, the Applicant Michael H. Fritsch invented an underwater contact lens that is disclosed in U.S. Pat. No. 5,831,713 (issued 3 Nov. 1998) and U.S. Pat. No. 6,048,063 (issued 11 Apr. 2000). The underwater contact lens disclosed and claimed by Dr. Fritsch in these two patents provided an underwater correction of vision, while providing a contour that enabled the contact lens to be held onto the cornea of the eye. In one embodiment of the inventions, the lens provides a corrective ability useable for both underwater and out-of-water uses.

Although the devices disclosed in the two Fritsch patents described above performed their intended functions in a workmanlike manner, room for improvement still exists. In particular, room for improvement exists in providing an underwater contact lens that incorporates improved features, such as an ability to resist trapping microbes on the eye surface covered by the lens, to thereby reduce the likelihood of microbial infection of the eye of the user.

Since the water in which the user is submerged while wearing the lens is not sterile, the water in which the user is swimming is a source for possible microbial seeding of the eye. Additionally, since the lens is separate from the human body, the lens has the potential to act as a foreign body fomite for entrapping and harboring microbes. Finally, one problem with the lens is that the fact that since the lens covers a cornea, the lens prevents normal eye lid blinking to cleansingly sweep the corneal eye surface of debris and microbes.

As is well known to contact lens wearers, one adverse side effect of wearing contact lenses is the potential for in eye infections. With air usage contact lenses, infection is avoided by regular cleaning of the lenses, limiting the wearing time of the lenses to finite time periods, and resting the eye between applications of the contact lens. Additionally, air-worn contact lenses have an advantage over water-worn contact lenses since air-worn contacts do not suffer the constant onslaught of microbes or impurities that attack the eye in a water-worn situation.

It is therefore one object of the present invention to provide a contact lens that is capable of being worn for extended time periods in a water environment, and that will include improvements over known contact lenses.

SUMMARY OF THE INVENTION

In accordance with the present invention, a contact lens is provided that is capable of being worn by a user. The lens comprises a contact lens body having an eye-engaging surface placeable against a surface of an eye and an outer surface. Microphobic features are provided in the lens for eliminating microbes from the eye-engaging surface.

Preferably, these microphobic features are chosen from a group consisting of electrical charge inducing agents, magnetic field inducing agents, chemical agents and textural features. Preferably also, the lens of the present invention is capable of being used for extended periods of time in a water environment, along with being useable in connection with non-water environments.

In accordance with another embodiment of the present invention, a contact lens is provided that is capable of being worn by a user. The lens comprises a contact lens body having an eye-engaging surface placeable against a surface of an eye and an outer surface. The lens also includes a reservoir portion capable of holding a performance enhancement agent for enhancing the performance of the lens.

Preferably, this performance enhancement agent is selected from a group consisting of sealant solutions, protective agents, therapeutic agents, antimicrobial agents, and medications.

The eye-engaging surface of the lens can include a plurality of channel members for receiving the performance enhancement agent, with a channel member serving as a reservoir portion that is capable of holding the performance agent. Alternately, the reservoir can comprise a bladder member served as a part of the contact lens body.

In accordance with another embodiment of the present invention, a contact lens is capable of being worn by a user for extended time periods in a water environment. The lens includes an eye-engaging surface and an outer surface. A venting system is provided for venting water from between the eye and the eye-engaging surface.

Preferably the venting system includes a series of channels formed on the eye-engaging surface. The channels are capable of containing water and directing water away from between the eye and the eye-engaging surface.

One feature of the preferred embodiment of the present invention is that it can include microphobic features. These microphobic features have the advantage of eliminating or reducing microbes from the eye-engaging surface. The advantage of this microbe eliminating or reduction feature is that it helps to reduce the likelihood of the user acquiring an eye infection by using a contact lens.

Another feature of one embodiment of the present invention is that the lens can include reservoir portion capable of holding a performance enhancement agent for enhancing the performance of a lens. This feature has the advantage of enabling the lens to contain solutions that will benefit the user's wearing of the contact lens. These performance enhancement agents can include such things as sealant solutions that will help better seal the lens to the eye, to thereby prevent water from entering the area between the eye and the eye-engaging surface of the lens. Additionally, performance enhancement agents such as protective, therapeutic and anti-microbial agents can be contained within the reservoir portion for protecting the eye against intrusion to microbes or other foreign deleterious objects in the eye. Further, the performance enhancement agents an include such things as medications that can be applied to the surface of the eye.

These and other features and advantages of the present invention will be better understood with reference to the drawings and detailed description of the best mode of practicing the invention perceived presently by the Applicants, that is set forth in more detail in the drawings and detailed description present below.

BRIEF DESCRIPTION OF THE DRAWINGS

FIG. 1A is a perspective view of a reservoir-type lens embodiment of the present invention having a "waffle-like" interior (eye-contacting surface);

FIG. 1B is a sectional view of the lens of FIG. 1A

FIG. 1C is a schematic representation of a small section of an interior surface of a lens similar to the lens of FIG. 1A wherein the protrusion/indentations of the surface are square in cross section;

FIG. 1D is a "surface sample" view similar to FIG. 1C, except showing an embodiment wherein the indentations/protrusions are pentagon-shaped;

FIG. 1E is a schematic surface sample view similar to FIG. 1D, except wherein the protrusions/indentations are shown as being circular;

FIG. 2 is a perspective view of a receptacle embodiment type lens;

FIG. 2B is a sectional view of the embodiment shown in FIG. 2A;

FIG. 3A is a perspective view of a bladder type lens of the present invention;

FIG. 3B is a sectional view of the bladder lens of FIG. 3A;

FIG. 10A is a perspective view of a magneto lens embodiment of the present invention;

FIG. 10B is a highly schematic cross-sectional view, taken along lines 10B-10B of FIG. 10A;

FIG. 11A is a perspective view of an alternate embodiment magneto lens of the present invention;

FIG. 11B is a sectional view taken along lines 11B-11B of FIG. 11A;

DETAILED DESCRIPTION

A. Overview

Figure 4A:
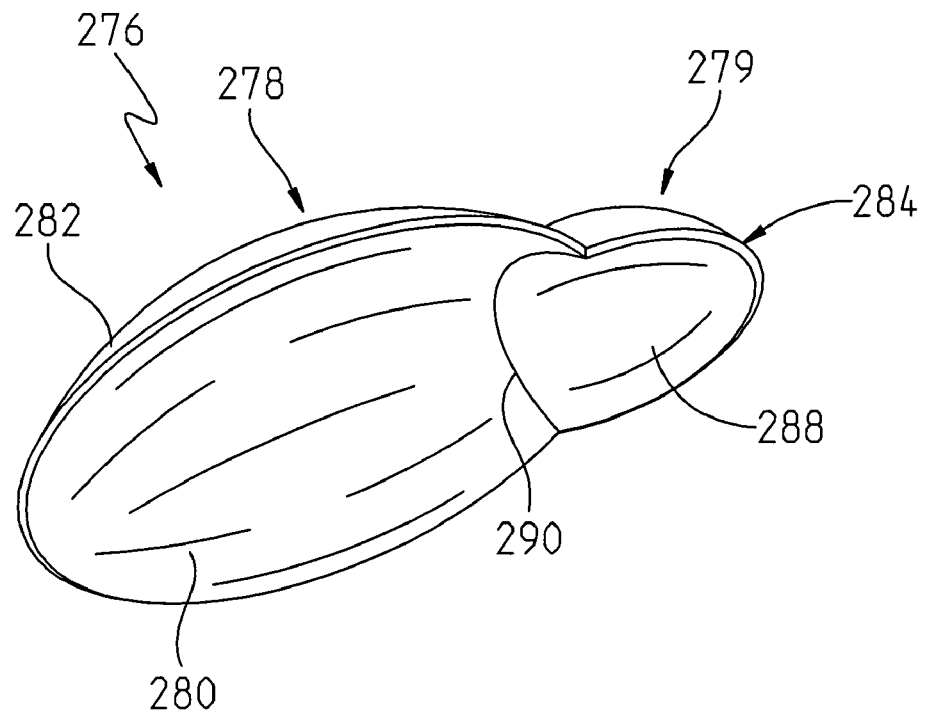
FIG. 4A is a perspective view of a first embodiment "attachment-type lens"

The present invention discloses a large number of different types of improvements that can be made to contact lenses, to better adapt the contact lenses for use in water environments, along with better adapting contact lenses for use in an air environment along with the water environment.

The many changes and improvements disclosed in the instant application fall into three primary categories. The first category deals with novel, inventive materials that can be used in connection with the contact lenses of the present invention. These lens materials include such things as incorporating microphobic agents into lenses that help to resist the incursion of impurities and microbes into the contact lens and the eye wearing the contact lens.

The second major category relates to lens designs. These lens designs relate primarily to physical characteristics and configurations of the lenses, such as lenses that incorporate reservoirs of various types into which corrective and performance enhancing substances can be placed, for enhancing the performance of the lenses.

The third category relates to lens substances, that relate to substances that can be applied by the users onto the eye and/or on to the lens. As will be discussed in more details below, these substances can include such things as performance enhancement agents, medication agents, therapeutic agents and agents that can help change the coloration of the contact lens, or the light transmission properties of a lens, such as substances that will help to block the passage of UV light through the lens.

B. Glossary

To best understand the various novel improvements provided by the instant application, a glossary is presented below that briefly defines many of the novel improvements and features of the present invention.

As used in the instant application, the following terms have the following meaning which meanings are meant to be non-limiting to the scope of protection afforded to the instant invention.

ELECTRO LENS—A lens that uses electrical charge to repel bacteria, micro-impurities and particles. Also, the charge may enhance, liberate or activate chemicals and medications. Nano-technology is used in some embodiments to achieve the desired results. (See FIGS. 9A-9C)

LEAFLET LENS—A lens that uses a leaflet ring around the lens to create a barrier to the corneal side of the lens. (See FIGS. 7A-7B)

MAGNETO LENS—A lens that uses magnetic field or magnetic polarity to repel micro-impurities, particles and bacteria. (See FIGS. 10A-11B)

MICROPHOBIC LENS—A lens that uses specific materials and designs to help eliminate microbes and impurities. Electrical charges, magnetic fields, nano-technology, chemical, active, and textural aspects are relevant.

NANO-ELECTRO LENS—A lens that uses nano-technology as components and form a system of electrical structure to achieve results.

NANO-LENS—A lens that uses nano-technology to accomplish results. The lens may use nano-particles, nano-wires, nano-cables, nano-bots (nano-robots), nano-tubules, and nano-channels.

NANO-MAGNETIC LENS—A lens that uses nano-technology to achieve magnetization of the lens and/or its surfaces.

O-RING LENS—A lens that uses O-rings or other shapes attached to or imbedded within the lens to isolate the interior of the lens under-surface from the exterior environment. (See FIGS. 8A-8B)

RESERVOIR LENS—A lens with three sub types depending on the shape of the reservoir: Receptacle, Attachment, and Bladder. These reservoirs are different in shape and design then the indentations of the Waffled Lens. (See FIGS. 2A-5B)

ROBO LENS—A lens that uses nano-robots to accomplish goals. (See FIGS. 14A-15B)

SUBSTANCES—A group of materials that are used together with the lens to improve its function. The Substances may be gels, liquids, dry, or semi-dry. They encompass a wide variety of chemicals, medications, cells and viruses depending on the needs.

WAFFLED LENS—A lens that has a waffled micro-appearance with the indentation of waffles allowing for filling with substances. (See FIGS. 1A-1E)

WATER-VENTING LENS—A lens that uses channels, like a car tire tread, to move water away from the corneal side of the lens. It may be actively pressed and "milked" by the eye blink reflex. (See FIGS. 6A-6E)

C. Lens Materials

The material from which the lens is made can have a significant impact on the ability of the lens to serve as a trap for holding impurities and microbes. This is especially true for lenses used for extended time periods in underwater environments. While underwater, microbes and impurities can be trapped within a porous lens material, or sealed underneath the lens. Once underneath the lens and trapped in the area between the eye-engaging surface of the lens and the cornea, the trapped microbes can reproduce, and invade and infect the eye tissues.

In one embodiment of the present invention, the lens is designed to be comprised of a non-porous material. A non-porous material that is formed to be devoid of crevasses, holes or matrices, provides no place in which microbes can be seated or trapped. Absent this space for trapping or seating microbes, the microbes would have difficulty reproducing in sufficient numbers to be capable of initiating an infection. The smooth surface of this non-porous material prevents microbes from attaching to the lens. Additionally, if the non-porous material used is a hydrophobic material, the hydrophobic material of the lens can prevent water itself from adhering to the lens.

Microbes use various methods to attach themselves to surfaces such as lenses, and to thrive metabolically. The ease with which microbes can attach themselves to surfaces is dependent upon the nature of the particular surface itself. Microbes are known to have specific electrostatic charges. Most microbial bacteria have a negative surface charge, and are repelled by a like electrical change. As such, the present invention contemplates manipulating the electrical charge of the surface of a contact lens, the magnetic activity of the contact lens, the chemical activity of the surface of a contact lens, and a texture aspects of a contact lens, in order to minimize adhesion to the lens by microbes and impurities. Once attached to the surface, may form a "cement-like" biofilm that further solidifies their attachment.

The same is true of micro-impurities as they often attach to a surface with an electrical charge, or a textured surface. Typical examples of this phenomena are the dust particles that stick to a television screen, or the fibers of clothes whose electrical charges give rise to 'static cling'.

Microbes and impurities are also commonly found in creases and crevasses. Further, microbes are found to thrive in organic debris. An example is the irregular surface of a pool bottom that collects dirt in the underwater cracks and crevasses. By deliberately using specific materials, designs, chemicals, electrical charges, nano materials and technology, and magnetic fields incorporated into the lens, the Applicants' invention can cause the lens surface of the instant invention to influence microbe and impurity attachments, entrapment and metabolism.

D. Microphobic Lenses

One aspect of the present invention is that microphobic features can be incorporated into the lens for eliminating microbes from the eye-engaging surface. These microphobic features include such things as electrical charges, magnetic fields, nano technology, chemically active materials, and texture-related modifications to the lens, to aid in repelling impurities and micro-organisms.

One particular embodiment of a microphobic lens is a so-called "electro lens". In an electro lens, a microphobic lens is designed, that has a surface, and preferably the eye-engaging surface, that is designed to employ an electrical charge, to either actively or passively repel bacterial attachment, and to repel micro-impurities and particles.

E. Electro Lens

These electrical charges are delivered as micro electrical charges at the lens surface. These micro electric charges are preferably created in the lens material by the lens material being actively charged in one or more of several ways. In one embodiment of the present invention, an electrical charge is formed to thereby create a microphobic surface, by activating the surface through a mixture of two or more ions, elements or compounds, so that a charge occurs and the lens surface becomes charged. This charging of the lens surface will be discussed in further detail in the Lens Substances section of the application below.

In another electrically charged microphobic surface embodiment, a nano or micro battery is imbedded into the body of the lens. Another embodiment employs a photogalvanic cell that is embedded within the lens to capture light energy, and convert it to electricity, to thereby provide the charge to the lens that is employed to repel the impurities and microbes.

The battery or photo galvanic cell can discharge electrical current directly into the body of the lens, which charge will then travel to the surface of the lens. Alternately, the charge can be discharged into channels within the lens that are filled with an electrically conductive material, such as a saline solution.

Another vehicle for transmitting the electrical current from the battery or photo galvanic cell to the surface is through a network of micro or nano sized wires and cables, such as quantum wires and quantum cables. The nano conductors may be on the surface of the lens, or within the lens, and positioned to deliver a charge to the surface. Delivered charge acts against the microbes to discourage attachment, to repel microbes, and to inhibit reproduction and metabolism of the microbe. Additionally, the delivered charge preferably acts to also repel the micro impurities, dust and other contaminates of the environment.

Figure 9A:
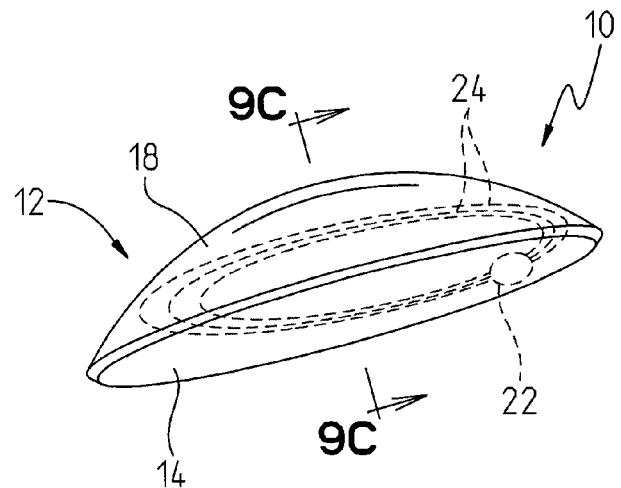
FIG. 9A is a perspective view of an "electro lens" of the present invention.
Figure 9B:
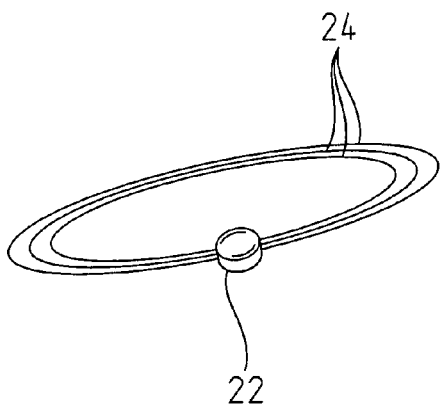
FIG. 9B is a schematic view of an electrical source and conductor useable with the electro lens of FIG. 9A.
Figure 9C:
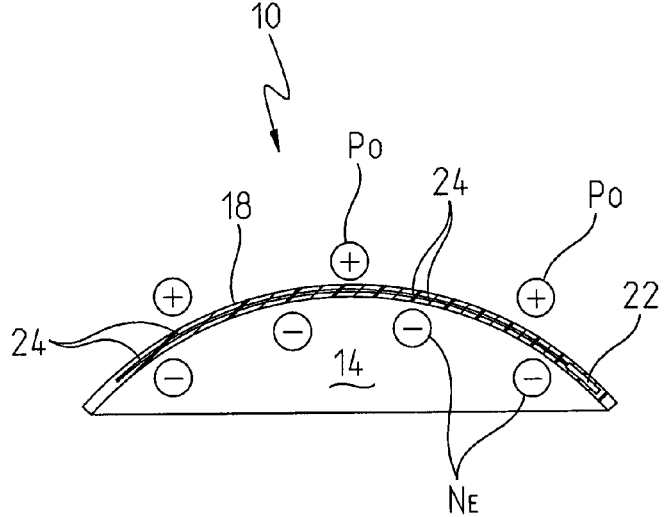
FIG. 9C is a highly schematic sectional view taken along lines 9C-9C of FIG. 9A showing charges induced by the electrical charge source and conductors of the electro lens.

An exemplary electro contact lens 10 of the present invention is shown in FIGS. 9A-9C. Contact lens 10 includes a generally bowl-shaped body 12, that is primarily made out of a standard contact lens material, such as a hydro gel material. The body 12 includes a concave eye-engaging surface 14, that is sized and configured for placement directly against the surface of the eye, and to be positioned in front of the iris and the pupil of the eye.

The body 12 also includes a convex outer surface 18. The electro lens of FIGS. 9A-9B includes an electrical source 22 that is disposed within the body 12, and a plurality of conductors 24 that extend throughout the body. The purpose of the electrical source 22 and conductors 24 is to impart an electrical charge to the lens. For example, the negative charges NE shown in FIG. 9C are disposed primarily adjacent to the concave eye-engaging surface 14. As discussed above, this negative charge would tend to repel similarly negatively charged microbes and impurities. Similarly, the convex outer surface 18 is shown as being positively charged.

The electrical sources described in this application can take a variety of forms. It can comprise a micro/nano battery, a photo cell, a photo-galvanic cell, or the like. The conductor 24 preferably comprises micro or quantum wires and cables, maybe nano electrodes and nanotubules.

In an alternate embodiment, the electrical charge of the battery or the photo galvanic cell may be used to activate, liberate or enhance chemicals or medications. The battery, photo galvanic cell, lens material, lens channels and conductor network act together as a system to be known as the electrical lens. The materials the electro lens is made from itself may include antimicrobial compounds and molecules within it. These compounds may be from a class of bacteriostatic or bacteriocidal ions or molecules. Antibiotics, medications and other substances may also be used both as curatives, and also as agents for repelling, and or killing microbial agents.

F. Magneto Lens

Another form of microphobic lens is a magneto lens. Many microbes are magnetically active due to ferromagnetic compounds and the structures. In another embodiment, a magnetized lens surface is used to repel microorganisms from the important parts of the lens close to and touching the eye. In this embodiment, a micro- or nano- or electro-magnet is embedded within the lens. The magnetic materials within the lens themselves may be polarized to specific fields of positive or negative poles. In the later case, the front of the lens (the surface that is not the eye-engaging surface) could be, for example, a positive field, while the eye-engaging back surface of the lens may be a generalized negative field.

Many bacteria are magnetically active and have both magnetically active ions and compounds within their walls. Other bacteria actively swim from one pole direction to another pole direction, such, for example, as swimming from a "South Pole" direction to a "North Pole" direction. By placing magnetic poles in or around the lens, bacteria can be repelled. This type of lens is to be known in this application and will be referred to herein as a "magneto lens".

Two embodiments of the magneto lens of the present invention 40, 56 are shown in FIGS. 10A-10B, and 11A-11B respectively. Turning first to FIG. 10A, a contact lens 40 is shown having a body 42 that is generally bowl-shaped, and similar in shape to the lens 10 of FIG. 9A. The lens 40 includes an eye-engaging inner surface 44 and an outer surface 46. A plurality of magnets 48 that can comprise very tiny or nano magnets are disposed within the body 42 of the lens.

Turning now to FIG. 11A, lens 56 has a body, an eye-engaging concave surface 60, and an outer surface 62. A plurality of magnets 64 are also disposed within the body 58 of lens 56.

The primary difference between the magnet of lens 40 and the magnet regime of lens 56 relates to the matter in which the lenses are polarized. In FIG. 10B, it will be noted that the magnets 48 are oriented so that a "south pole" charge is oriented adjacent to the eye-engaging concave surface 44, whereas a "north pole" field is oriented adjacent to the exterior surface 46. By contrast, the magnetic regime of lens 56 is such that the north pole is oriented adjacent to the central portion of the exterior surface 62, and the peripheral portion of the interior surface 60 of lens 56, whereas the south pole is oriented toward the central portion 63 of the interior surface 60, and the peripheral portion 65 of the exterior surface 62. In this regime, microbes having a "south pole" oriented magnetic field, would be caused to move toward the periphery of the interior surface 60 of the lens.

In another embodiment of the micro phobic lens, the lens material is comprised from a porous or looser matrix material in some selected areas of the lens; or alternately, throughout the lens. Within the porous material, lens substances can be incorporated into the lens that prevent microbial attachment, microbial metabolism and growth, and microbial reproduction. The porous and matrix material areas of the lens may be confined just to a certain area such as the eye-engaging surface of the lens that is in closest contact with the eye cornea. Alternately, the porous and matrix material containing areas can be disbursed throughout the majority or entirety of the lens.

In one embodiment of the present invention, the lens may be designed so that the porous material may be applied as a veneer to the eye-engaging contact surface. In another alternate embodiment, the substance may occupy the concave interior of the lens, taking on an appearance of a spoon filled with porous micro phobic materials.

G. Nano Lens

In a further embodiment of the present invention, nano materials are used to make the lens. The lens may be made from nano materials or in combination with nano materials, to create a "nano lens", as the term is used in this application.

To the Applicants knowledge, such nano materials are not used in prior art contact lenses. The function of adding nano materials is to enhance existing lenses by providing quality superior to existing materials and lenses. Using nano tubules and nano electrodes has the potential to increase the strength, reduce the weight and enhance or provide for electrical conductivity, magnetism, smoothness, flexibility, transparency, layering, nano-sized design features, and nano robots or nanobots.

In one nano lens embodiment, a nano material can be used alone or in combination with conventional materials as a lens strengthener. For example, the nano materials can be incorporated into the lens as nano fibers that are interwoven with conventional materials, in a manner that is analogous to the manner in which steel fibers are woven into a steel-belted tire to increase its strength. Nanofibers could also be used to encapsulate the lens to add strength to the exterior of the lens.

Alternately, a lens may be made entirely of high strength nano materials, that, in theory, would be strong enough to resist daily use, wear and tear that are then conventional materials from which lenses are made currently. Such a lens that was comprised of a nano material would hold up longer to the mechanical daily regime, wherein the lens is removed from the eye, cleaned, stored and then replaced into the eye. Repetitive cleaning and usage that can cause bending or breaking and crushing action could be better resisted by the nano materials from which such a lens is comprised, as compared to currently used hydrogel-type materials.

Another advantage that is believed to be attainable using nano materials, is that since nano materials are lighter in weight than conventional materials, less material can be used, to provide a lens having the same strength. Alternately, if this same volume of material is used, the lens should have a lighter weight.

The absolute weight of a lens is important because it relates to both how many design features can be incorporated into the lens, and also the weight affects how the lens positions itself on the eye, and how the lens reacts to eye movement and blinking.

The design features that are added to a lens lead to heavier and more bulky lenses, the number of design features that therefore can be added to a lens are limited, before the addition of additional features makes the lens become impractically large and bulky for everyday use. Additionally, the bulkier and heavier that a lens becomes, the more likely it is that the lens will passively drift away from the intended eye centered location, and will catch and move with the eye lids' blinking and be displaced with eyeball rotation.

As will be familiar to contact lens users, a misplaced contact lens that does not fit over the pupil and iris loses its ability to serve its corrective vision function, along with becoming a significant irritant to the user.

In another embodiment of the Nano-Lens, the nano-materials used in the lens are electrical conductors used to power nano-bots. The nanobots are nano-robots. Nano-robots have functions such as opening and closing nano-doors to the Substance Indentations, Receptacles and Attachments described under "Lens Designs". Further, they can clean the lens surfaces as a nano-robot function. This lens embodiment is to be known and will be referred to herein as the "Robo Lens".

Figure 14A:
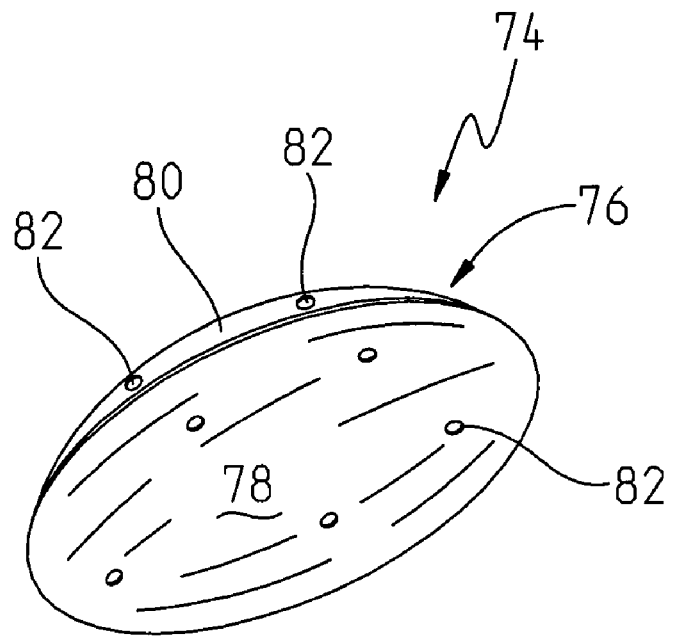
FIG. 14A is a robo lens of the present invention showing a plurality of cleaning or coloring nanobots thereon.
Figure 14B:
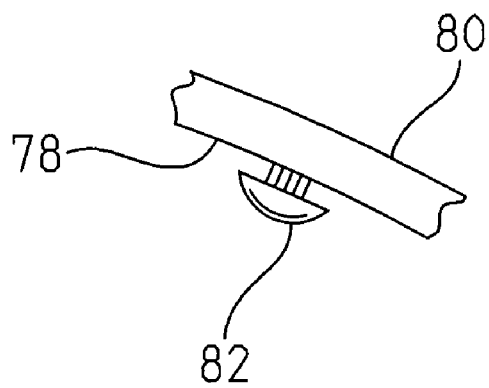
FIG. 14B is a schematic, highly enlarged view of a portion of lens FIG. 14A showing a nanobot thereon.
Figure 15A:
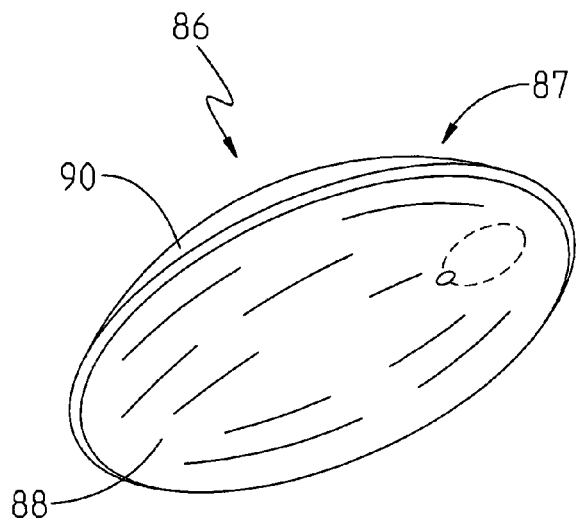
FIG. 15A is a perspective view of an alternate embodiment nanobot lens.
Figure 15B:
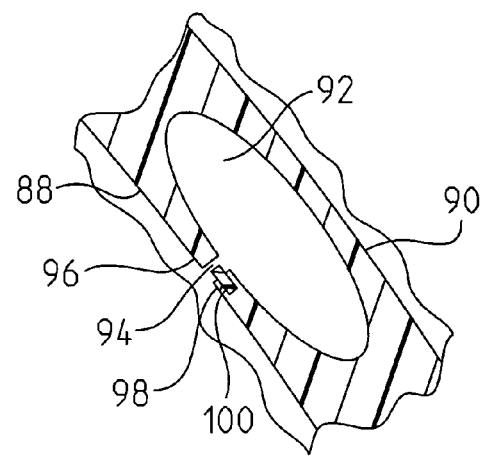
FIG. 15B is a greatly enlarged view of a reservoir portion of the nanobot lens of FIG. 15A showing a nanobot.
Figure 15C:
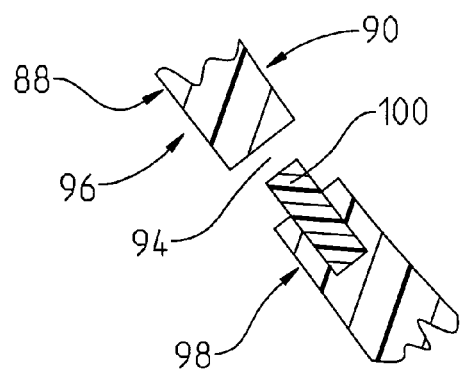
FIG. 15C is a further enlarged view of the nanobot on the lens of FIG. 15A showing the nanobot being used as a bladder opening valve.

Exemplary nanobot-containing embodiment lenses 74, 86 are shown in FIGS. 14A-14B; and FIGS. 15A-15C respectively. Lens 74 of FIG. 14A includes a body 76 that can be made out of a conventional contact lens material. The lens 74 includes an eye-engaging concave surface 78, and an outer surface 80. A plurality of moveable nanobots 82 are disposed on one or both of the eye-engaging concave surface 78 and the outer surface 80. The nanobots can either be cleaning nanobots 82 or else colorizing nanobots. As best shown in FIG. 14B, the nanobots 82, when serving as cleaning nanobots are movable along the surface, to perform cleaning functions as they move along the surface.

Lens 86 of FIGS. 15A-15C is a reservoir 92 containing lens 86. Lens 86 includes a body 87 having an eye-engaging surface 88 and an outer surface 90. A reservoir 92 is formed in the body, and includes an aperture 94, for placing the interior of the reservoir 92 in fluid communication with the eye-engaging surface 88, and, when the lens 86 is placed on the eye of the user, to place the reservoir 92 in fluid communication with the space between the eye-engaging surface 88 of the lens and the eye of the user (not shown). The aperture 94 is defined by a first and second well segments 96, 98. A gate valve type nanobot 100 is disposed within the second well segment 98, and is movable between an open and closed position. When in the open position (as shown in FIG. 15C), the aperture 94 is open, to allow fluid to flow between the reservoir 92 and the space between the eye-engaging surface 88 and the user's eye. However, the nanobot 100 is movable to a closed position, wherein the nanobot is in engagement with first well segment 96, to close off aperture 94, to thereby prevent fluid communication (or at least retard the flow of fluid) between the reservoir 92 and the space between the eye-engaging surface 88 and the user's eye.

In another embodiment of the Nano-Lens, the nano-materials used in the lens are electrical conductors and nano-motors. This is to be known as and referred to herein as the "Nano-Electro Lens". Due to the markedly better conductivity of many Nano-Materials, the lens design can use conducting fibers known as "quantum wires" and "quantum cables" to carry electrical charges around and through the lens in many ways and for many reasons. The routes of electrical charge will be predicated on specific needs. For example, if microbes or micro-impurities are charged in one particular way, then a network of electrical charge is used to repel that charge and therefore repel the microbes and impurities. This feature of repelling the microbes and micro-impurities is referred to herein as the "Microphobic Lens", as described under "Lens Materials".

In another embodiment, the Nano-Electro Lens using nano-materials allows a change in color of the lens by activating photoelectric Substances that darken in response to charge. The color change may accomplish cosmetic or light shading effects. When a nano- or micro-photogalvanic cell embedded in the Electro Lens is activated by sunlight, its electrical output will rise in proportion to the sunlight strength. The increased electrical output will more strongly activate the photoelectric Substances to darken the lens.

In another embodiment, the sun-blocking color change and shading are accomplished by movement of colored and/or transparent particles from a concentrated area in the lens to a dispersed pattern within the lens. Thus, the particles may be present in the lens periphery and allow for clear natural light to completely enter the eye. With activation however, the particles either migrate to cover the lens and impart a color change of the entire surface or a light blocking effect or are each stretched from a small size to larger to cover the lens. This is similar to the color-changes induced by chromophores of squid or lizards.

The lens color change works by two mechanisms. The first mechanism allows for migration of pigment deposits at the periphery of the lens towards the center, with covering of the clear with pigment rows. The second mechanism stretches one or more concentrated pigment deposits to a thinner but larger area. The stretching is done by contraction of muscle-like nano filaments.

Figure 16A:
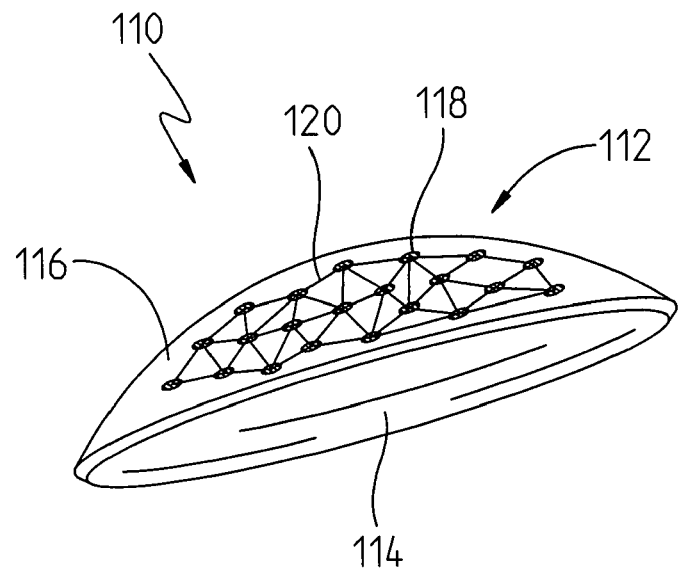
FIG. 16A is a perspective sun blocking lens employing a fiber-containing pigment for blocking the sun.
Figure 16B:
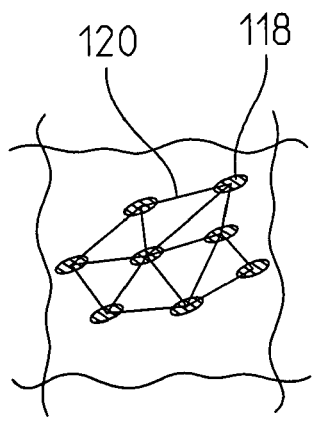
FIG. 16B is a greatly enlarged schematic view "tissue sample" showing fibers in a non-contracted orientation.
Figure 16C:
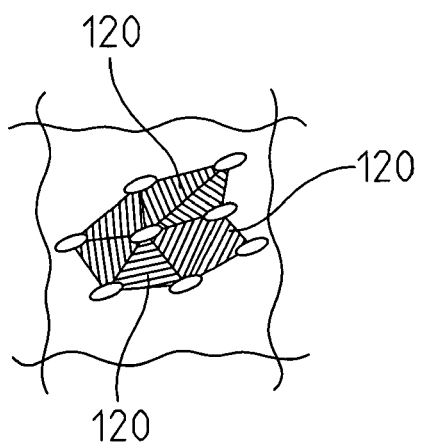
FIG. 16C is a tissue sample view similar to FIG. 16B showing the fibers in a contracted view.

Lens 110 shown in FIGS. 16A-16C includes a body 112 that is generally bowl-shaped, and includes an eye-engaging surface 114, and an outer surface 116. Embedded within the body 112 or else disposed on one of the eye-engaging surface 114 and/or outer surface 116, are pigment-containing deposits 118, that are connected together through fibers 120.

In FIGS. 16A and 16B, the fibers 120 are shown in their non-contracted position, wherein they concentrate the pigment areas, so that the pigment areas do not cover a large portion of the area of the body 112 of the lens 110. By contrast, FIG. 16C shows the fibers 120 in their contracted position, that thereby causes the area that is covered with pigment to expand and thereby cover a greater proportion of the area of the body 112. When the pigment covers this greater area, the lens will take on a tinted appearance, similar to a sun glass lens.

In another embodiment, the Nano-Lens is used to bring a magnetic field into the lens. This is referred to in this application as the Nano-Magnetic Lens. The magnetism is propagated by magnetic nano-materials. The magnetism and magnetic fields are actuated by way of strands of magnetically active nano-fibers in the lens, and in nano-magnets imbedded in and on the lens.

Figure 17A:
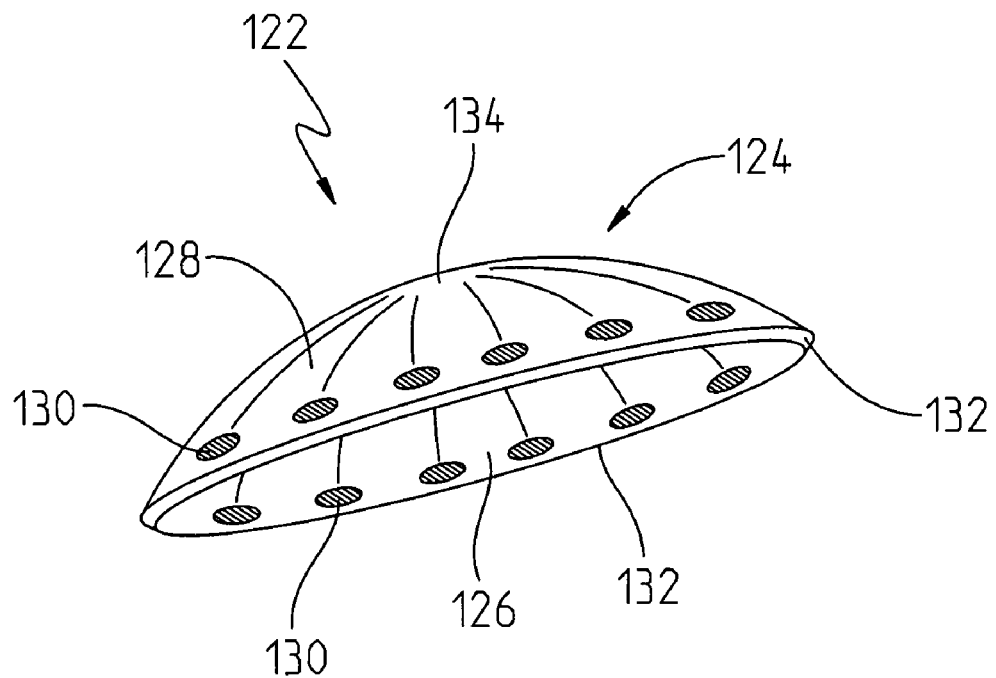
FIG. 17A is an alternate embodiment sun blocking lens showing concentrated pigments.
Figure 17B:
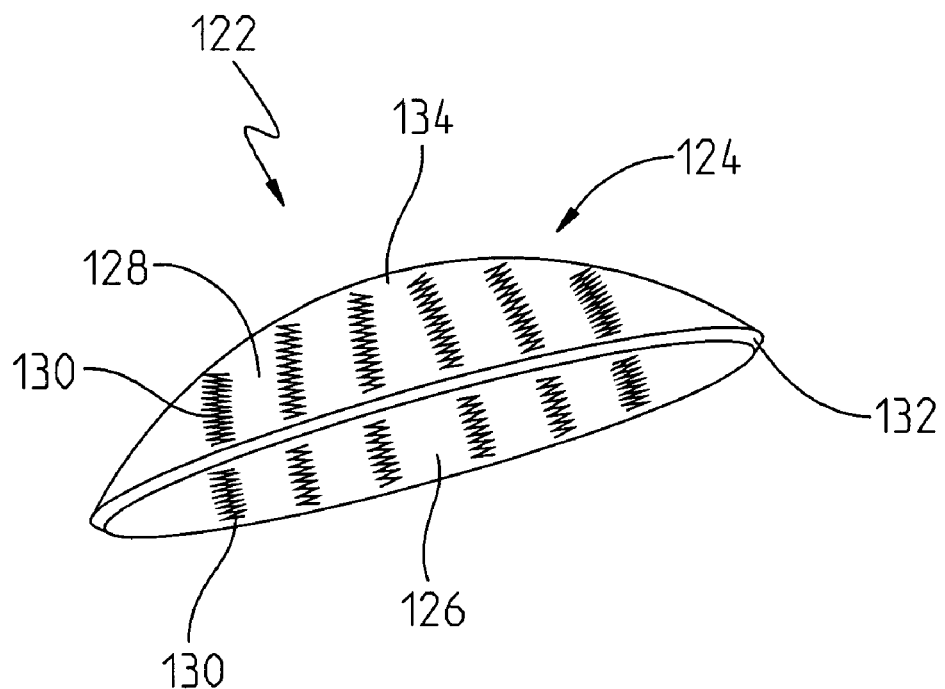
FIG. 17B is a perspective view of the lens of FIG. 17A showing the pigments being dispersed, and the sun blocking lens in the shaded state.

Turning now to FIGS. 17A and 17B, another lens 122 that is pigmented is shown. Lens 122 includes a body 124 having an eye-engaging surface 126 and an outer surface 128. Lens 122 includes a series of peripherally disposed pigment deposits 130. In FIG. 17A, the peripheral pigment deposits 130 are shown as being in their concentrated orientation, wherein the pigment is concentrated close to the outer peripheral edge 132 of the lens, and away from the central portion 134 of the lens. In FIG. 17B, the lens 122 is shown in the pigment dispersed orientation, wherein the pigment is dispersed more evenly between the peripheral edge portion 132 and the central portion 134. With the pigment more evenly dispersed over the surface of the lens 122, the lens 122 would take on more of a tinted appearance similar to a sun glass lens.

As a further Materials embodiment, the above described features of the "Lens Materials" are used for contact lenses of routine use in air and everyday life.

H. Lens Designs

In some ways, the lens materials and designs overlap somewhat. Thus, the "spoon filled with antibiotic powder embodiment" embodiment discussed above will be appreciated to incorporate both design and material features into the finished lens configuration.

One of the problems encountered in the placement of a lens underwater is the possibility of water penetrating behind the lens and lodging between the lens and the eye cornea. The water itself may be inconsequential to the eye. However, in a swimming or scuba-diving situation, microbes will be carried with the water to the potential space behind the lens and become trapped behind the lens. These trapped microbes could start an infection.

I. O-Ring Lens

In one design embodiment, the lens incorporates one or more seal forming structures, such as one or more circumferential annular O-rings. It would be as though an O-ring had been partially buried within the lens with a portion of the O-ring extending outwardly from the eye engaging surface of the lens. More than one of these rings can be placed in a circumferential concentric manner, with each ring being of a different diameter than the neighboring one. Overall, looking at the lens from the front it would have a target-like appearance due to the concentric O-rings within it. In cross-section, the lens would have thickenings where there are O-rings present. The actual O-ring may not be a perfect "O" in cross-section, but may have other cross-sectional shapes, such as square cross-sections to create a better seal.

Figure 8A:
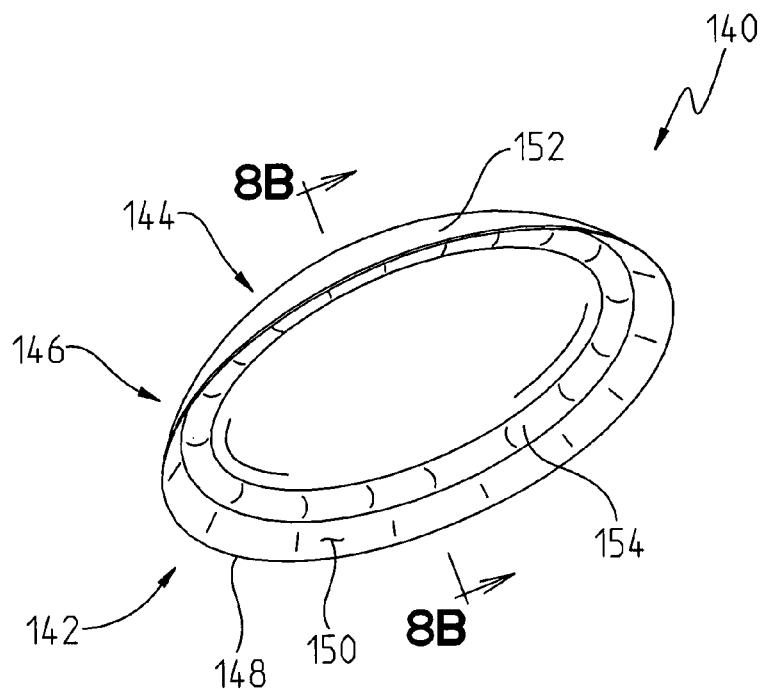
FIG. 8A is a perspective view of a "O-ring" lens.
Figure 8B:
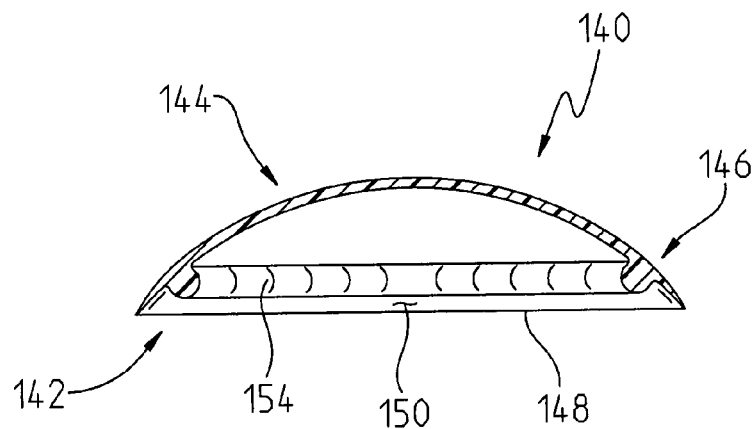
FIG. 8B is a sectional view taken along lines 8B-8B of FIG. 8A.

An O-ring lens 140 of the present invention is best shown in FIGS. 8A-8B. Lens 140 includes a body 142 that can be made out of a conventional material. The body 142 includes a central portion 144, that is the portion of the lens 140 that is generally configured for placement over and adjacent to the iris and pupil of the eye.

The peripheral portion 146 is disposed radially outwardly of the central portion 144, and terminates at its extreme, at the peripheral edge 148.

The lens body 146 includes an eye-engaging concave interior surface 150 that is placeable against the eye of the user, and an outer surface 152. An annual O-ring 154 is formed to extend outwardly from the eye-engaging concave surface 150, so that the inner diameter of the O-ring 154 is smaller than the inner diameter of the eye-engaging concave surface 150 would be in the absence of the O-ring 154. Although the O-ring 154 is shown in FIG. 8A as having a semi-circular cross section to give the O-ring 154 a hemi-cylindrical configuration. However, it will be appreciated that the O-ring 154 can have other shapes, such as having a square or rectangular cross section, to thereby form a "square tube".

The actual O-ring material may be of conventional or nano-rubber types and combinations thereof. The O-ring can work in conjunction with a sealant and/or protective Substance, which is described later. The O-ring design is a barrier that prevents microbe contaminated water from entering between the lens and the eye cornea. Also, the O-ring can serve to localize a Substance, such as a colorant, to the center of the lens or to one of the circular depressions between concentric O-rings. The O-ring used together with the contact lens is referred to herein within this application as an "O-ring Lens".

J. Leaflet Lens

In another design embodiment, the lens has a seal forming structure that comprises a skirt-like Leaflet attached to the eyeball surface of the lens. The leaflet includes a first peripheral inner skirt and a second peripheral outer skirt portion. The first and second skirt portions are disposed in a concentric relation to each other. The leaflet is designed to prevent water from entering under the lens. When the contact is applied to the eye, it will have the free-edge outer skirt of the contact as its outer edge, and the leaflet as a secondary edge. One or more of the Leaflets may be used. A contact lens using a skirt-like Leaflet is referred to herein as "Leaflet Lens".

Figure 7A:
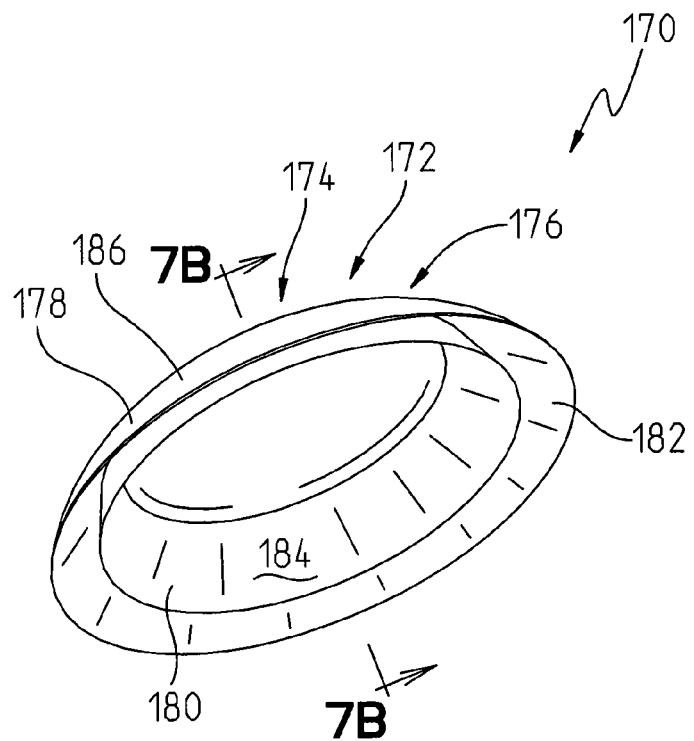
FIG. 7A is a perspective view of a "leaflet lens"
Figure 7B:
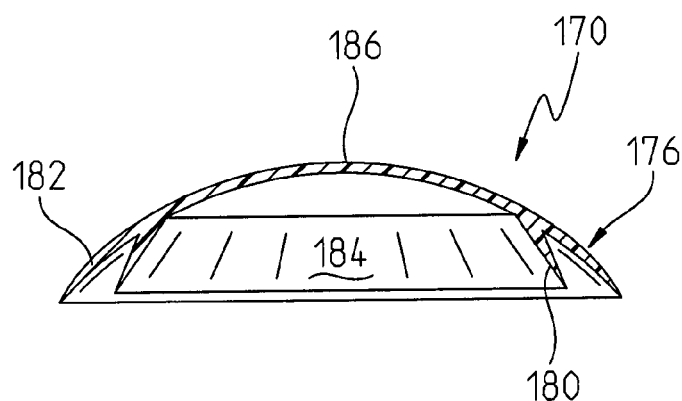
FIG. 7B is a sectional view taken along lines 7B-7B of FIG. 7A.

A leaflet lens 170 is shown in FIGS. 7A and 7B as including a body 172 having a central portion 174 that, when worn by the user, is disposed adjacent to the iris and pupil of the eye. A peripheral portion 176 is disposed radially outwardly of the central portion 174 and terminates in a peripheral circumferential edge 178.

The leaflet lens 170 includes an inner, annular peripheral skirt 180, and an outer, annular peripheral skirt 182 disposed at the peripheral edge 178. The peripheral skirts 180, 182 provide a barrier for water, to keep water from entering into the space between the eye-engaging surface 184 and the user's eye, when the lens 170 is used in a water environment, such as when a user is swimming, scuba diving or the like. The lens 170 also includes an outer surface 186.

K. Waffled (Small Reservoir) Lens

In another design embodiment, the surface of the lens that is closest to the eye cornea has a "waffled" surface. If one envisions a round breakfast waffle surface, then a rough mental image of the lens surface emerges. That is, the surface has indentations that are purposefully created. Individual indentations when multiplied on the lens surface add-up to a "waffled" appearance. The actual surface indentations can have different shapes and depths and may have a repetitive pattern or combination of patterns. The purpose of the indentations is to allow for placement and retention of sealant, protective, and therapeutic Substances. The size and depth of the indentions determine the capacity of each to be a reservoir. Thus, the eye engaging inside surface of the lens is coated with a layer of Substances that reside primarily in the reservoir indentations of the lens. The purpose and types of Substances is explained below under "Lens Substances". The indentations may also be placed on the outer surface of the lens close to the eyelids.

In a further lens design embodiment, a circumferential annular ring of indentations is placed around the periphery of the lens adjacent to or at the radially outer edge portion of the lens. The indentations are meant to act as retainers or reservoirs of Substances. The ring itself would act as a protective barrier by action of the Substances in the ring. The overall ring may be composed of a single ringlet of indentations, multiple ringlets, or may have a staggered ringlet alignment. The ringlet(s) may also house micro- and nano-batteries or magnets which deliver current and field strength to the Substance and increase or add to the Substance's innate properties. Antimicrobials and medications can be housed within these reservoir indentations.

A small reservoir, "waffle" lens 200 is shown in FIGS. 1A-1E, as including a body 282 having an eye-engaging surface 204 and an outer surface 206. The eye-engaging surface 204 is formed to include a series of protrusions 210, and a plurality of fluid-containing channels 212 disposed between the protrusions 210. In this regard, the waffle-like eye-engaging surface 204 can take on the appearance of a "waffle". It will be appreciated that the protrusions and channels can be reversed, such that the structures shown as square protrusions 210 can actually comprise small bowl-like channels 210, whereas the line-like channels 212, can in fact be protrusions that extend between the bowl-like channels 210.

As discussed above, a performance enhancing fluid or agent can be disposed within the channels 212.

Other protrusion and channel arrangements are shown in FIGS. 1C, 1D and 1E. FIG. 1C is similar to protrusion 210, channel 212 arrangement of FIG. 1A, in that it shows a plurality of square protrusions and channels 216, with channels 218 disposed there between the protrusions 216. FIG. 1D shows a plurality of pentagon-shaped protrusions 222 and irregularly shaped channels 224 therebetween. FIG. 1E shows a plurality of circular protrusions 228 with irregularly spaced channels 230 therebetween. Alternately, it will be appreciated that FIG. 1E can be a "golfball"-like configuration where structures 228 comprise dimple-like channels, with the spaces 230 there between being relatively raised to constitute protrusions relative to the dished-out dimple-like channels 228.

L. Large Reservoir Lenses

In another design embodiment, an actual Substance such as a therapeutic, performance enhancing, medicinal or anti-microbial substance is placed in a larger separate receptacle at the edge of the lens or as an attachment to the lens, as a bladder within the lens, or as an attachment to the lens. The embodiment using a "Receptacle" is meant as a special larger reservoir area for deposit of Substance within the circumference of the lens. The embodiment using a "Bladder" has a reservoir volume within the lens. The design embodiment using an "Attachment" is a wholly separate area from the lens that may be of an "outrigger" appearance connected to the main lens body or of a "two circles melting together" configuration. These Receptacles, Bladders, and Attachments are different from the "Waffle", or "O-ring" lens designs. The Receptacles, Bladders, and Attachments may open to either side of the contact lens. The Receptacles and Attachments may be more than one per lens and connected to each other. The Receptacles and Attachments may hold and dispense the user's medications, or other Substances.

In one embodiment, the Bladder of the lens is mechanically emptied by the repetitive eyeblinking of the user. This is in conjunction with a slow-release substance containing the desired chemical or medication substances.

The lens is designed to liberate substances within the Bladder reservoir over a period of time, slowly dispensed in small amounts with each eyeblink. In another embodiment, the Bladder of the lens is emptied by micro-portals operated by nano-technology with power sourced from micro- or nano-batteries.

Several large reservoir lenses are shown in FIGS. 2A-5B. Turning first to FIGS. 2A-2B, a large reservoir receptacle-type lens 240 is shown that includes a body 242, an eye-engaging surface 244 and an outer surface 246. A receptacle-type reservoir 248 is formed in the body 242, to be in fluid communication with the space between the eye-engaging surface 244 and the user's eye, when the user is wearing the lens 240.

As shown in FIG. 3A, a bladder-type reservoir lens 252 is shown. The bladder-type reservoir lens 252 includes a body 254 having an eye-engaging surface 256 and an outer surface 258. A bladder-like reservoir 260 is formed in the body 254, and includes an aperture 264 for placing the reservoir 260 in fluid communication with the space between the eye-engaging surface 256 and the surface of the eye (not shown) of the user, when the user is wearing the contact lens 252. Aperture 264 is defined by a cover member 266, that comprises a portion of the eye-engaging surface 256 and the body 254, and overlies the bladder-like reservoir 260.

Figure 4B:
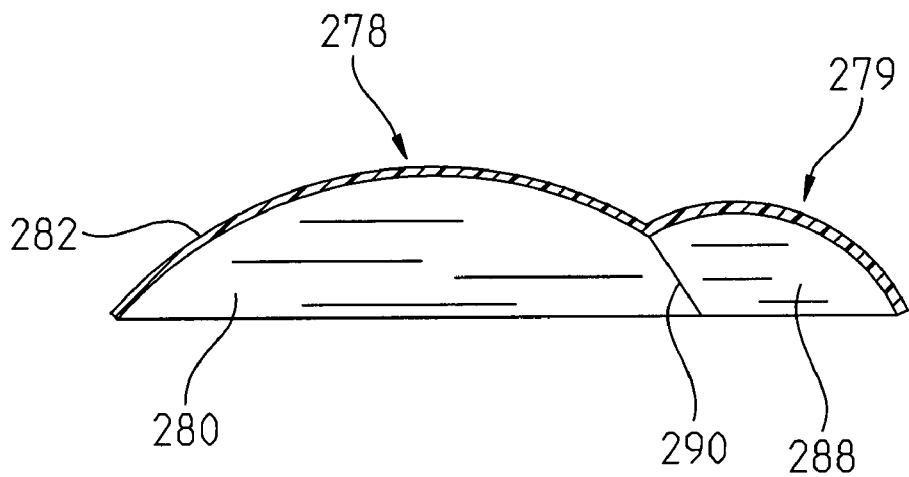
FIG. 4B is s sectional view of the "egg-yolk" attachment-type lens of FIG. 4A.

An attachment type lens 276 is shown in FIGS. 4A and 4B. The attachment lens shown in FIGS. 4A and 4B is referred to as the "splitting egg yolk" design, because it includes a lens body portion 278 and a reservoir portion 279 that are placed side by side next to each other in an attached relationship, much like an egg that is undergoing mitosis. The lens body portion 278 includes an eye-engaging surface 280 and an outer surface 282. The reservoir portion 279 includes an attached, but partially separated reservoir portion 279, that defines a hollow interior 288, that comprises a reservoir. The reservoir 279 formed by the hollow interior 288 is in fluid communication with the space between the eye-engaging surface 280 and the user's eye through a channel 290 that connects the two portions 278, 279 of the lens.

Figure 5A:
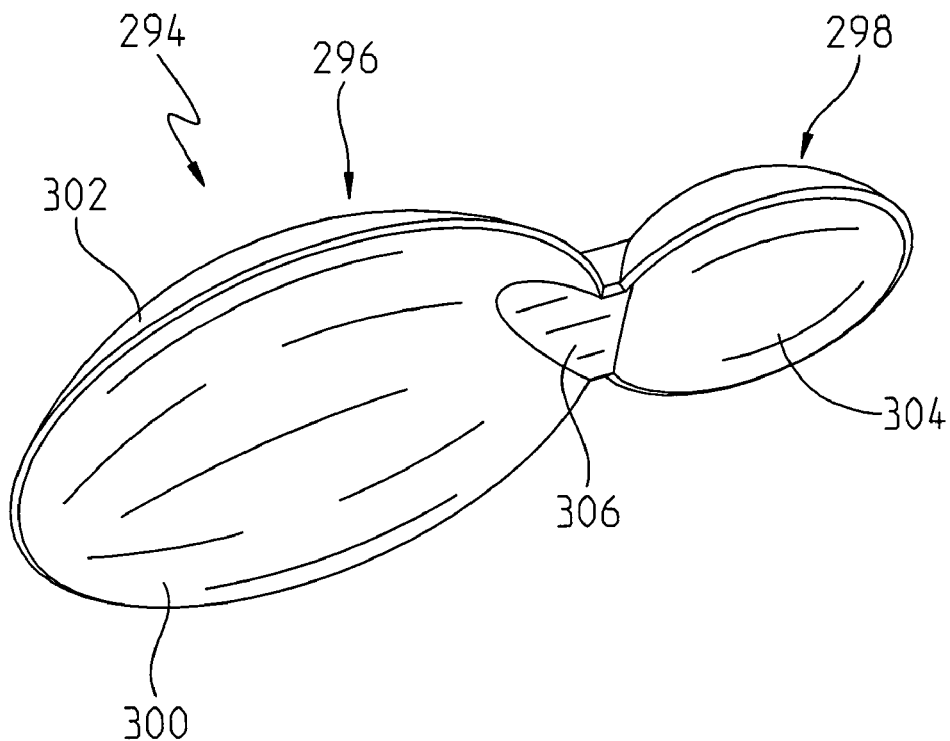
FIG. 5A is a second embodiment attachment-type lens showing a "out rigger" type lens.
Figure 5B:
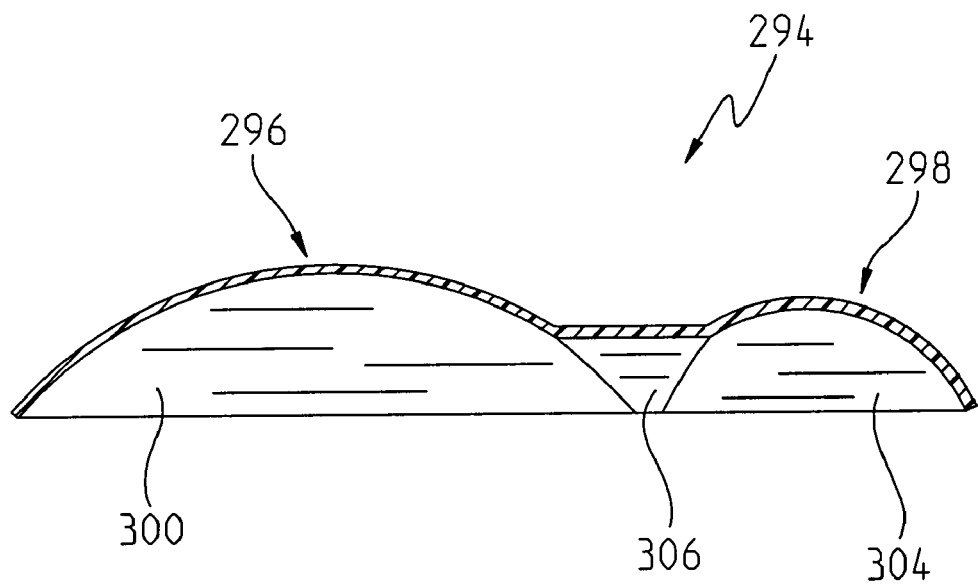
FIG. 5B is a sectional view of the "out rigger" attachment-type lens of FIG. 5A.

Another "out rigger type" attachment lens 294 is shown in FIGS. 5A and 5B. The primary difference with the lens 294 of FIGS. 5A and 5B is that the reservoir portion 292 is somewhat more spatially separated in lens 294, than is the reservoir portion 279 in FIGS. 4A and 4B. The out rigger type attachment lens 294 includes a lens body portion 296 and a reservoir portion 298. An eye-engaging surface 300 and an outer surface 302 are also provided. The reservoir portion 298 has a hollow "interior" that defines the reservoir 304 that is in fluid communication with the eye-engaging surface 300 through the hollow channel 306. As discussed above, a performance enhancement fluid or other appropriate material can be placed in the reservoir 304.

M. Water-Venting Lens

A further design embodiment incorporates the use of the eyelid blinking energy and mechanical eyelid movement to prevent water from entering under the lens and to pump water away from the underside of the lens. In this design, much like the water-venting mechanism of a car tire-tread the placement of the eyelids over the lens during blinking causes the water to be vented or purged away from underneath the lens. The lens surface has channels on its inner surface which direct the water away from the lens. As the eyelid closes, it pushes on the lens and activates the pattern of channels on its inner surface. Within the channels are micro-baffles that act as one-way valves, like the valves inside of an anatomic vein that prevent back flow or blood, or duck-valve. In one embodiment there are a series of elevated ridges on the outer surface of the lens which increase the eyelid pressure on the venting channels.

A water venting lens 320 is shown in FIGS. 6A-6E, as including a body portion 322, an eye-engaging concave surface 324, and an outer surface 326. A series of water venting channels 328 are formed in the eye-engaging surface 324, and are designed to enable water to flow outwardly from the central portion 336 of the lens toward the peripheral edge 338 of the lens.

The channels 328 can, and preferably include check-type valves, that allow water to flow in one direction (from the central portion) 336 toward the peripheral portion 338, but that do not allow water to flow in the other direction, from the peripheral portion 338 toward the central portion 336.

Figure 6A:
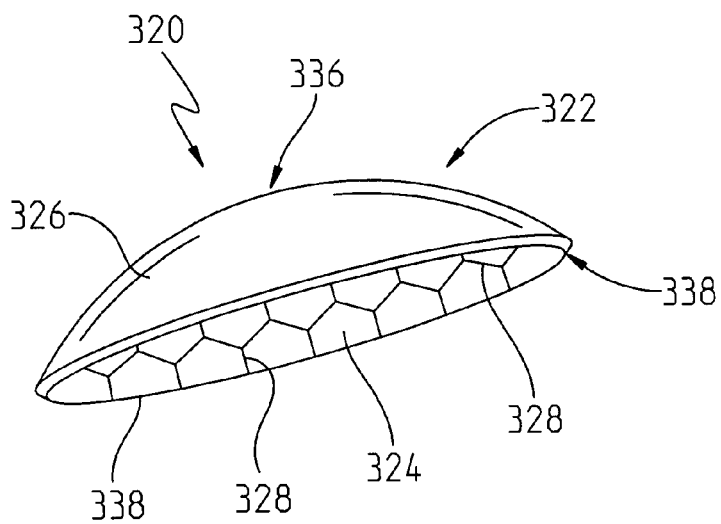
FIG. 6A is a perspective view of a fluid (water) venting lens embodiment.
Figure 6B:
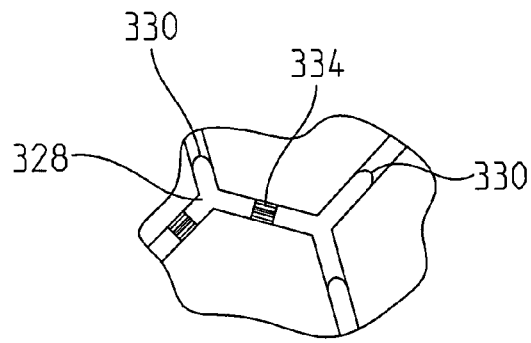
FIG. 6B is an enlarged view of a small section of the eye-contacting surface of the lens of FIG. 6A.
Figure 6C:
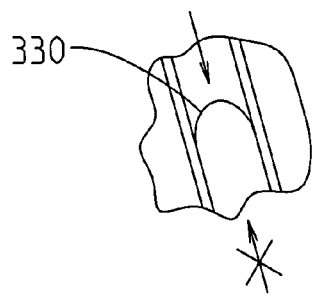
FIG. 6C is an enlarged view of the tissue section of FIG. 6B showing a "venous-like valve" embodiment.
Figure 6D:
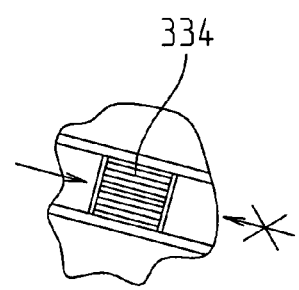
FIG. 6D is a highly enlarged view, similar to FIG. 6C, except that it shows a first embodiment "duck valve"
Figure 6E:
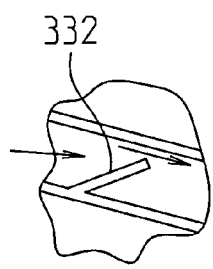
FIG. 6E is a highly enlarged surface view, similar to FIG. 6D, except showing a second type of duct valving system.

As shown in FIG. 6C, a venous-type valve 330 can be used as a check valve. Alternately, a first embodiment duck valve 332 (FIG. 6E) or a second embodiment duck valve 334 (FIG. 6D) can be used to serve as these check valves.

N. Pin-Hole Lens

The lens may have a layer non-light transmitting area of the lens which creates an opening smaller than a normal iris opening for light to enter the eye. The opening may be a single or multiple type. The smaller opening(s) is created to sharpen the image. It will focus the entering light to give a clearer image similar "squinting" the eyes.

Figure 12A:
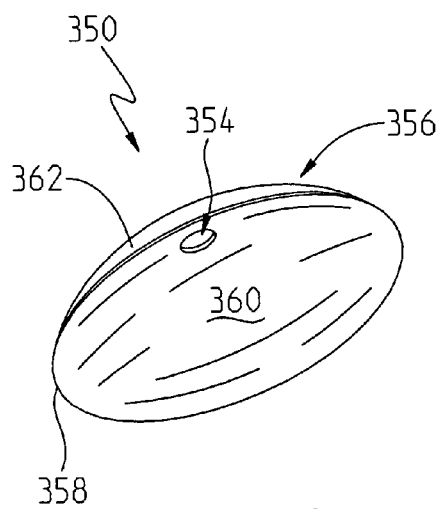
FIG. 12A is a perspective view of a single opening for the "pin hole lens" embodiment of the present invention.
Figure 12B:
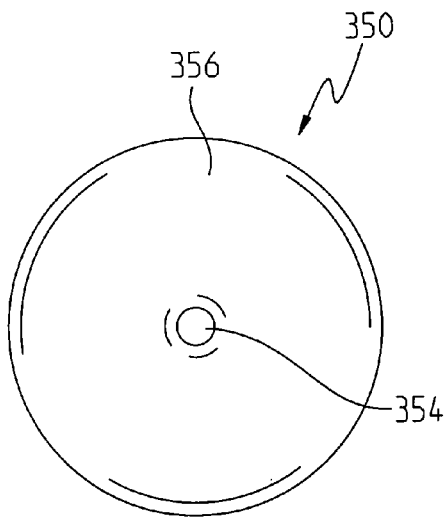
FIG. 12B is a top view of the lens shown in FIG. 12A.

A first embodiment pin hole lens 350 is shown in FIGS. 12A and 12B as having a body 352, that includes a generally transparent central portion 354, that forms an effective pin hole. The lens 350 also includes a largely opaque or translucent peripheral portion 356 that is disposed radially outwardly of the central transparent portion 354, and extends between central transparent portion 354 and the peripheral circumferential edge 358. The lens 350 also includes an eye-engaging surface 360 and an outer surface. It will be understood that although the lens is referred to as "pin hole" lens, there likely is no actual "hole" used. Rather, the central portion 354 comprises a transparent material through which the user can see.

Figure 13A:
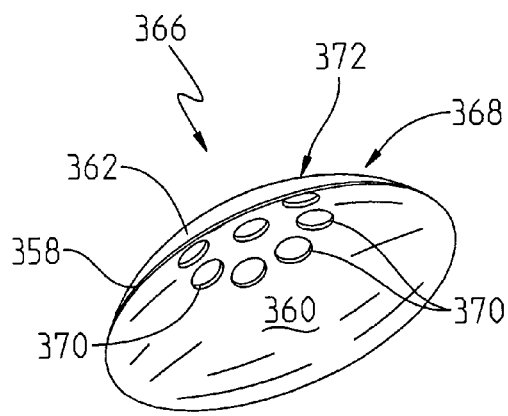
FIG. 13A is a perspective view of a multi-opening "pin hole lens" of the present invention.
Figure 13B:
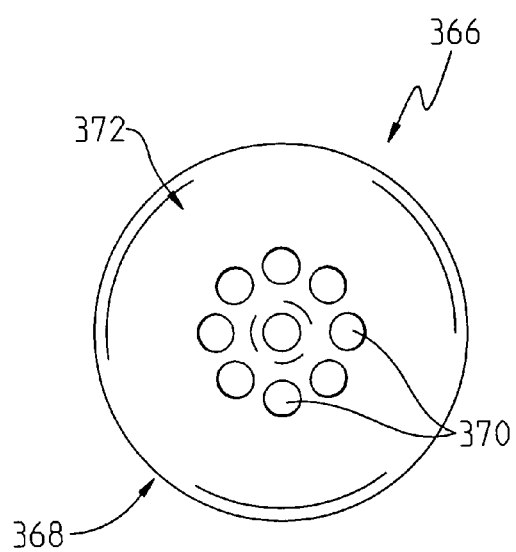
FIG. 13B is a top view of the lens of FIG. 13A.

A multi-hole pin hole lens 366 is shown in FIGS. 13A and 13B as including a body portion 368, and a centrally disposed collection of transparent portions 370. A largely opaque peripheral portion 372 is disposed radially outwardly of the transparent portion 370, and extends generally to the peripheral circumferential edge 374. The lens 366 also includes an eye-engaging surface 360 and an outer surface 362.

The lenses described in this patent application may be designed to be of a disposable lens type or of a reusable type. The different lens designs may be washable to remove residual substance or to clean the lens of microbes and debris and prevent infection or trauma to the eye.

In a further design embodiment, the above described features of the "Lens Designs" are used for contact lenses of routine use in air and everyday life.

O. Lens Substances

Various substances referred to collectively in this application as the "Substances" are used as part of the lens or applied to the lens to help solve the concerns and problems not addressed fully by the Lens Materials and Designs. The Lens Materials and Lens Designs discussed above may be used in conjunction with "Lens Substances" discussed herein to provide an even more superior function. Additionally, the Substances may be used in conjunction with and within the chamber of the Applicant's prior two lens patents, as described in the "Background of Invention". The Lens Substances discussed herein may be beneficial to further remedy the problem of contaminated water entering under the lens and lodging between the lens and the eye cornea, and to remedy the problems (microbial growth) caused by the contaminated water. Additional problems addressed concern light reflection, light penetration, coloration, appearance, electrical charge, medication dispensing, and nano-technology applications.

P. Substance Application and Methods of Use

The possible Substances and their combinations are many. The important overall feature is that the lens material or the inside surface of the lens facing the eye has a Substance placed into or attached to it. The Substance(s) may be a gel, ointment, powder, or solid; and may be active on its own, or be activated by another Substance, or be activated by naturally occurring materials or actions. Examples of naturally occurring materials or actions might be eye tears or eyelid motion. The Substances may be of a non-water soluble material to help exclude water, or, a water soluble material to help in dissolving matter, or a combination of Substances in different areas.

The Substances can be of a gel or ointment consistency. However, the lens may have a dry, semi-dry, or wet coating on it. The coating may be activated by another substance, action, or body function such as eyelid blinking, body heat, or moisture. Also, external activation by ultraviolet light or a gas may cause the Substance to be activated.

The Substance may comprise a timed-release material. Thus, a slow-release, an immediate release, or a combination thereof may be used. Multiple Substances can be in one or more separate Receptacles, Bladders or Attachments.

The Substances have a consistency assuring proper adhesiveness to the lens and release from the eye.

The Substances formulations are not toxic to the eye and cause minimal or no irritation and no long-term adverse sequelae. Thus, during the time the lens is worn on the eye, the Substances are formulated to have a favorable relationship to the eye regarding ph (5.0-8.0), buffering, osmotic pressure, density, size, solubility, toxicity, irritability, transparency, visual acuity, and comfort characteristics.

The Substances are applied to the inside of the lens in multiple ways. An application of Substance may be dispensed onto the lens surface from a container, just before being worn. The user would place a drop sized portion onto the lens surface before applying the lens to the eye. In one Substances embodiment, a veneer-like wafer of Substances is attached to the lens. The wafer may be concave or convex to better fill the lens and fit the eye. In this case, the veneer may be of a gel-like consistency or a flexible solid that may have a wet surface. The Substances may also be applied to the outer eyelid surface of the lens.

Q. Lens Substances

In one Lens Substances embodiment, preventive Substances are used to coat the lens on the inner surface between the lens and the eye cornea. The Substances can be applied directly to a smooth lens surface, or to a lens design already described above, or to any lens design available. A combination of different Substances may be used in different parts of the lens. For example, one Substance type may be in the outer periphery of the lens, and another Substance type in the more central area.

In another Lens Substances embodiment, several layers of substances are applied to form multi layer veneers so that a stratification of Substances is seen in this multi-layered approach. The different layers have the purpose of allowing different substances to be used. Practically, the significance is that each Substance layer may fulfill a different task. Thus, the first Substance layer might achieve an air-tight attachment. The next Substance layer might deliver an anti-microbial agent to the eye surface. The next Substance layer might deliver medication used daily by the wearer, or deliver a performance enhancing agent.

The multilayered Substances may also be present at the lens surface all at once yet still be placed in a side-by-side, rather than an over-and-under layering to form a "checkerboard" pattern similar to a tiled floor or a striped pattern wherein the different stripes are comprised of different substances. In this side-by-side embodiment, the different substances are all simultaneously attached to the lens while at the same time touching the eye cornea. They can also be attached in receptacles, indentations or attached to each other in layers. Various patterns may be used, dictated by ease of manufacturing technique and individual user needs.

The Substances may also be attached to the outer surface of the lens in lieu of, or in addition to this application of the substances to inside of the lens.

In one embodiment, the Substance layer may manipulate light reflection from and light penetration through the lens. The Substance may comprise a substance that is capable of either filtering, blocking or reflecting certain wave lengths of light. Such a light blocking or light filtering agent could serve to filter and/or block ultra-violet light to protect the user's eye against ultraviolet radiation. The Substance may be a light filter or tinted to enhance contrast or vision. The Substance may change color depending on ambient light conditions. In this way, a clear lens can be transformed into a tinted, "sunglass" lens by application of the substance onto or into the lens. In another embodiment, the Substance has pigmented particles that can migrate or change size and shape within the area of the lens, and are driven by electrical, mechanical, chemical and light mechanisms. These would have an action similar to chromophores in color-changing lizards, octopi and act as sunglasses to shield against light.

In another embodiment, the Substance has a colorant in its composition. The colorant, when applied to the lens, will change the appearance of the eyeball, most commonly, the iris. Unlike prior art lenses that are "tinted" or "colored" as a permanent feature of the lens, this Substance colorization is easily changeable from one color to another. By using or washing the first colored Substance, another can be applied to the lens to achieve another color. The colorized Substance can exist as a temporary coating applied to the concave eye engaging surface of the lens, or in the spaces between concentric O-rings in the O-ring Lens, as in the Receptacles, or Attachments of certain lens designs.

In another embodiment, the Substance is the source of an electrical charge. The Substance may possess one or more charge creating ions, or, contain chemicals which, upon mixing, create a charge. In the latter case, the surface of the lens may have a chemical coating that when moisturized begins to generate charge. Alternately, a separate dispenser may be used to isolate chemicals from each other. When a charge is desired, the dispenser can mix the chemicals and apply the chemicals to the surface of the lens to begin the electrical charge generation. For example, within the Substance dispenser, there may be a Bladder formed within, or attached to the lens that is filled with a first Substance which when ruptured, mixes with a different Substances found within a dispenser bladder of the lens. Thereafter, the dispenser is used to apply the charged substances to the lens. Also, one Substance may already be a part of or applied to the lens as a veneer or in a Bladder when another substance is applied from a dispenser. Just prior to use, the electrical charge can be initiated by mixing the Substances.

The Substance may simply be a conductor of charge. Thus, if a battery or photogalvanic cell is used, as described under "Lens Materials-Microphobic Lens", then the Substance may be activated by the electrical current or act a conductor of charge by the Substance being placed within the channels within the lens which link the electrical charge with the lens surface.

In another Substance embodiment, the Substance can contain various medications. Medications from a wide variety of medication classes can be used. From classes of medications directed at the eye itself to systemically acting medications, all types of appropriate medication may be present within the Lens Substances. It should also be noted that by having different substances within two different lenses, different medications could be dispensed through each eye. It is at the heart of this embodiment that medications can be delivered by the lens through the tissues of the eye and adjacent eyelid structures to the eye and systemically to the body. Other chemicals, molecules, cells and viruses not specifically recognized as "medications" may be found in the Substances as active or inactive ingredients.

In another Substance embodiment, nano-technology is found in the Substance. Specifically, as part of the active ingredients, nano-robots or nanobots may be found. These nano-devices may be used in various ways to improve the lens function and wearability.

The nanobots can actively move across the lens surface and clean the lens, or debride or clean the corneal surface of microbes and impurities. This cleansing action results in improved vision, better hygiene of the eye, improved performance and durability of the lens. The nanobots can also actively open and close various openings in the lens. These openings may be to the electrical conduction channels, Bladders, Receptacles, Attachments, Ringlets, and indentations previously described under "Lens Designs".

The lens Substance may be covered by a protecting membrane that is removed prior to usage. The protective membrane is meant to prevent displacement, contamination, oxidation, and other Substance damaging effects prior to usage. The protective membrane may be removed mechanically by fingers or forceps, or may dissolve on its own after application to the eye.

The lens may have a re-loadable aspect to the Receptacle(s), Bladder(s), Attachment(s), O-rings, Waffles, and other design features so that Substance can be re-applied repetitively. Also, the concave inside of the lens may be re-loaded with the same or a new Substance after the initial Substance is deemed "used".

Although the Applicants have disclosed the best mode of practicing the invention perceived presently by the Applicants, it is to be understood that specific disclosed embodiments are by way of example and are not limiting. Consequently, the reader will understand that variations and modifications exist within the scope and spirit of the present invention. It is intended that the appended claims be construed to include alternative embodiments to the extent permitted by the prior art.

What is claimed is:

1. A contact lens capable of being worn by a user, the lens comprising:
   a contact lens body having an eye engaging surface placeable against a surface of an eye and an outer surface, and
   micro phobic features for reducing the amount of microbes on the eye engaging surface, the micro phobic features comprising textural features;
   wherein textural features comprise a venting system for venting water from between the eye and the eye engaging surface;
   wherein the lens body includes a central portion and a peripheral edge portion disposed radially outwardly of the central portion;
   wherein the channels include a valve for directing the flow of water in a direction toward the peripheral edge of the contact lens body; and
   where the valve comprises a series of baffles, and the baffles comprise at least one of venous valves and duck valves.

2. A contact lens capable of being worn by a user, the lens comprising:
   a contact lens body having an eye engaging surface placeable against a surface of an eye and an outer surface, and
   micro phobic features for reducing the amount of microbes on the eye engaging surface, the micro phobic features comprising textural features;
   wherein the contact lens body has a central portion and a peripheral edge, and the textural features comprise a seal forming structure disposed adjacent to the peripheral edge of the lens body for reducing the ability of water to infiltrate a space between a user's eye and the eye contacting surface; and
   wherein the seal forming structure comprises a leaflet having an inner skirt portion and an outer skirt portion, the inner and outer skirt portions disposed in a concentric relation to each other.

3. A contact lens capable of being worn by a user, the lens comprising:
   a contact lens body having an eye engaging surface placeable against a surface of an eye and an outer surface, and
   micro phobic features for reducing the amount of microbes on the eye engaging surface, the micro phobic features comprising textural features;
   wherein the contact lens body has a central portion and a peripheral edge, and the textural features comprise a seal forming structure disposed adjacent to the peripheral edge of the lens body for reducing the ability of water to infiltrate a space between a user's eye and the eye contacting surface; and
   wherein the seal forming structure comprises an O-ring structure, the O-ring structure comprising a raised annular ridge formed to be a part of, and extend outwardly from the eye engaging surface.

4. The contact lens of claim 3 wherein the O-ring is capable of forming a water tight seal when the eye engaging surface of the lens is placed into engagement with an eye of a user.

* * * * *